(12) United States Patent
Blaivas

(10) Patent No.: US 8,670,621 B1
(45) Date of Patent: Mar. 11, 2014

(54) USING INVARIANTS OF SPHERICAL HARMONICS TO ROTATIONAL AND TRANSLATIONAL TRANSFORMATIONS FOR IMAGE RECOGNITION IN INDUSTRIAL AND SECURITY APPLICATIONS

(71) Applicant: Alex Simon Blaivas, Sandy, UT (US)

(72) Inventor: Alex Simon Blaivas, Sandy, UT (US)

(*) Notice: Subject to any disclaimer, the term of this patent is extended or adjusted under 35 U.S.C. 154(b) by 0 days.

(21) Appl. No.: 13/621,276

(22) Filed: Nov. 6, 2012

(51) Int. Cl.
*G06K 9/66* (2006.01)

(52) U.S. Cl.
USPC ........... 382/192; 382/154; 382/181; 382/209; 382/224

(58) Field of Classification Search
None
See application file for complete search history.

(56) References Cited

U.S. PATENT DOCUMENTS

| | | | | |
|---|---|---|---|---|
| 6,853,745 | B1* | 2/2005 | Jacobs et al. | 382/154 |
| 7,058,217 | B2* | 6/2006 | Thornber et al. | 382/154 |
| 7,236,630 | B2* | 6/2007 | Sato et al. | 382/173 |

OTHER PUBLICATIONS

Zhang et al. "Face Recognition Under Variable Lighting using Harmonic Image Exemplars", 2003 IEEE Computer Society Conference on Computer Vision and Pattern Recognition (CVPR'03).*

Zhang et al. "Face Recognition from a Single Training Image under Arbitrary Unknown Lighting Using Spherical Harmonics", March 2006, IEEE Transactions on Pattern Analysis and Machine Intelligence, vol. 28, No. 3, pp. 351-362.*

Mak et al. "An extension of spherical harmonics to region-based rotationally invariant descriptors for molecular shape description and comparison", 2008, Journal of Molecular Graphics and Modelling vol. 26, pp. 1035-1045.*

Wang et al. "Generalized Quotient Image", 2004 IEEE Computer Society Conference on Computer Vision and Pattern Recognition (CVPR'04).*

Novotni et al. "Shape retrieval using 3D Zernike descriptors", 2004, Elsevier, Computer-Aided Design, vol. 36, pp. 1047-1062.*

Canterakis, "3D Zernike Moments and Zernike Affine Invariants for 3D Image Analysis and Recognition", 1999, In 11th Scandinavian Conf. on Image Analysis, pp. 85-93.*

* cited by examiner

*Primary Examiner* — Matthew Bella
*Assistant Examiner* — Jason Heidemann
(74) *Attorney, Agent, or Firm* — Workman Nydegger

(57) ABSTRACT

A new method of image processing and recognition through calculation of expansion of projected images onto a spherical coordinate system with at least two sets of presumed spherical harmonics defined on it with different positions of their North Poles, and subsequent computation of expansion coefficients of the images into the abovementioned orthogonal systems of spherical harmonics, and then calculating the invariants of images to rotational and translational transformations as vector and scalar products of two series of expansions. The invariants of the images will be stored in a magnetic library and subsequently used in image recognition in various industrial and security/military applications.

8 Claims, 4 Drawing Sheets

USING INVARIANTS OF SPHERICAL HARMONICS TO ROTATIONAL AND TRANSLATIONAL TRANSFORMATIONS FOR IMAGE RECOGNITION IN INDUSTRIAL AND SECURITY APPLICATIONS

BACKGROUND OF THE INVENTION

1. Field of the Invention

In general, example embodiments of the invention are concerned with systems, methods and devices suitable for use in the field of image recognition. In some example embodiments, invariant aspects of a computed image are generated and compared with a real image to determine if the real image corresponds with the computed image, and one or more actions may be taken depending upon the results of the comparison.

2. Related Technology

Some aspects of related technology are set forth in *Special Functions and the Theory of Group Representations* by Naum Ja. Vilenkin.

BRIEF SUMMARY OF SOME EXAMPLE EMBODIMENTS

In general, example embodiments of the invention are concerned with systems, methods and devices suitable for use in the field of image recognition. Such systems, methods and devices may be used to compare a real image with a computed image. In some instances, one or more actions may be taken based on the results of such a comparison.

By way of illustration, a first example embodiment of the invention may be used to monitor a large gathering of people so as to compare visual patterns of actual behavior of people with stored information concerning behavior. If an aspect of observed behavior is determined to correspond with behavior categorized as potentially threatening, appropriate action may be taken with respect to those exhibiting such behavior.

In a second example embodiment, a set of invariants constructed based on performance of an act, method or procedure by one or more human actors can be used to direct and control the operation of one or more machines in the performance of the same, or similar, act, method or procedure.

A third example embodiment includes a processor for image recognition through projection of external image onto an imaginary or real spherical surface similar to the human or animal eye with subsequent computerized calculation of expansion of projected external image into a series of orthogonal Spherical Harmonics with associated Legendre Polynomials. The external image/projection therefore will be expanded into two or more sets of Spherical Harmonics with different positions of their North Poles with subsequent or simultaneous calculation of invariants of the visual image to rotational and translational transformations in three-dimensional space using pairs of Spherical Harmonics with identical L and M coefficients but different positions of their North Poles. The invariants will be stored in a database to create a library of invariants for subsequent image recognition and classification.

A fourth example embodiment is directed to a library of invariants of spherical harmonics to rotational and translational transformations described in the aforementioned third example embodiment will be used to support decision making while monitoring traffic on city's intersections. The images of street scenes will be expanded into Spherical Harmonics, rotational and translational invariants computed and compared with the library of stored invariants to switch lights in the intersections to optimize the traffic.

A fifth example embodiment is directed to a device having a webcam and a computer, programmed to calculate Spherical Harmonics and their rotational and translational invariants described in the aforementioned third example embodiment, will be used to direct mechanical arms with mechanical hands whereas steel or composite wires attached to servomotors will change positions of mechanical fingers. The whole assembly will be used for performing various industrial operations following a memorized set of invariants stored in a digital library constructed while observing a skilled operator performing the same or similar task.

A sixth example embodiment is directed to a device having a webcam and a computer, programmed to calculate Spherical Harmonics and their invariants as described in the aforementioned third example embodiment, will be used to monitor large gatherings of people including, but not limiting to, airport and railroad terminals, outdoor concerts, commuter traffic, town squares and street intersections with pedestrian traffic of large cities. The calculated invariants of observed visual patterns of human behavior will be compared to the library of invariants and when unusual or threatening patterns are detected the homeland security or other agencies will be alerted thus contributing to countering terrorism or other illegal behaviors.

Finally, a seventh example embodiment is directed to a device having a webcam and a computer, programmed to calculate Spherical Harmonics and their invariants as described in the aforementioned third example embodiment, will be used to direct firing from automatic weaponry to achieve greater accuracy and instantaneous reactions to threatening situation in military environments as defense against missiles fired at helicopters and at civilian and military fixed wing aircraft by hostile forces.

The foregoing are presented solely by way of example and are not intended to limit the scope of the invention in any way.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

The current invention utilizes a few known mathematical facts. The analogy is constructed in reference to the human eye. The distribution of the light intensities over the spherical surface of the retina of living eye viewing the outside world can be described as a mathematical function of two variables F ($\phi$, $\Theta$) where the first angle (phi) is the longitudinal or azimuthal and the second (theta) is the zenith (polar/latitudinal) angle (the angle between a given point on the retina and the central axis of symmetry which is the line of sight in case of an eye) of the spherical coordinate system and the function values are the local light intensities.

The abovementioned function F (vector) can be easily broken into three components each representing one of three basic chromatic colors: red, green and blue. The separation of components will be done programmatically since they occur naturally in a color image of webcam's pixeling system.

For further consideration and simplicity's sake only one function (a unified "gray" function of overall intensity of light on the retina) is being considered.

The technical realization of the invention involves the following components:
1. A webcam
2. A multi-CPU computer, presumably with 96 processors or more.
3. A software package computing the coefficients of the expansion of the function F into basic orthogonal Spherical Harmonics $$Y_l^m$$

of degree l and order m, where:

$$Y_l^m(\theta, \varphi) = N e^{im\varphi} P_l^m(\cos\theta)$$

and $$P_l^m$$

is an Associated Legendre Polynomial and N is an independent normalizing constant.

A multi-processor computer is needed because of the complexity of calculations. The expansion coefficients of the visual image into two independent sets of Spherical Harmonics might take considerable time if performed on a single processor machine.

Figure 1:
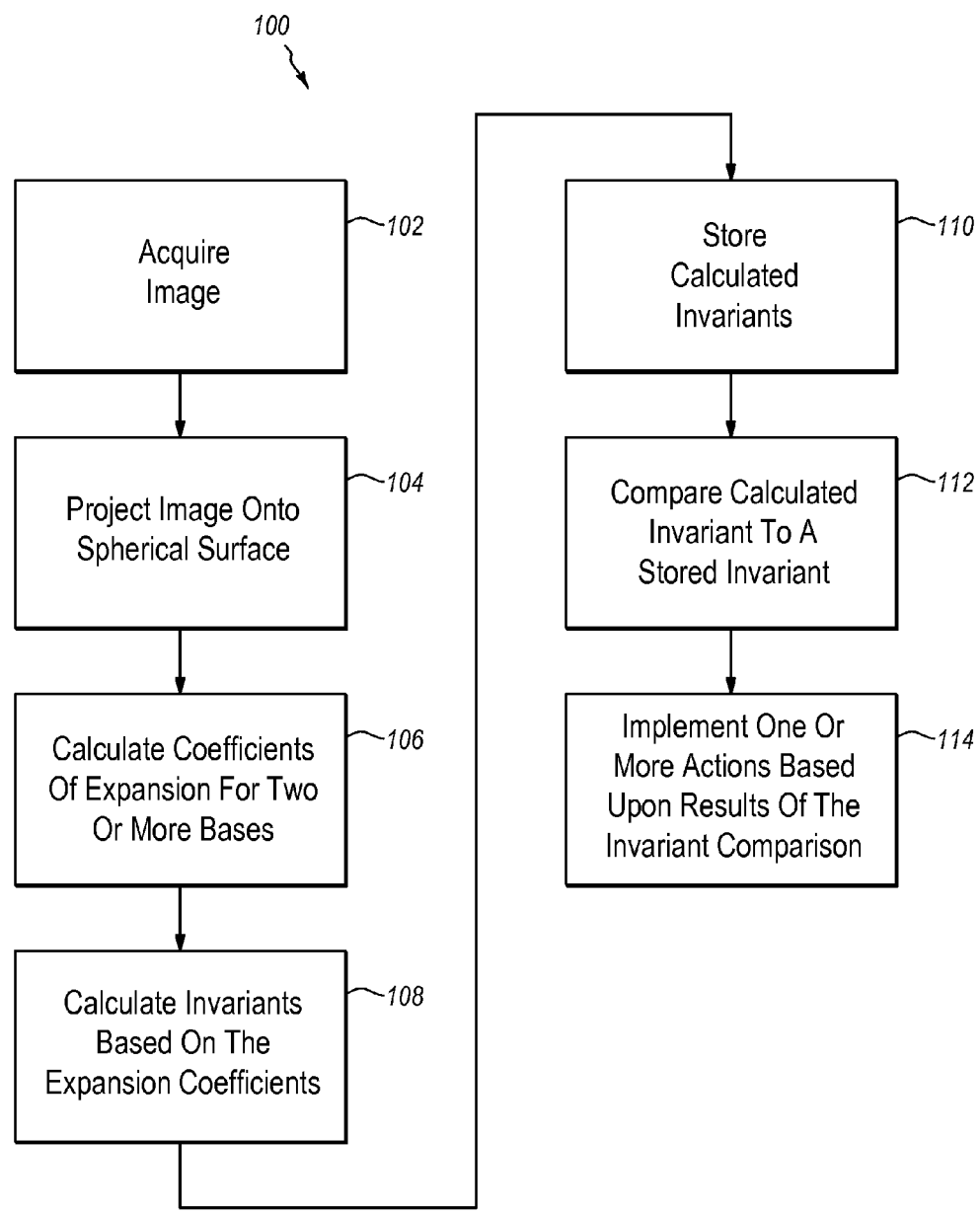
FIG. 1 is a flow diagram that discloses aspects of a method for generating and comparing invariant elements.

With reference now to the example of FIG. 1, a first step 102 of a method 100 involves acquisition of an image, such as by a webcam for example. A next step 104 of a calculation method is the transformation (projection) of the webcam image from the original flat surface analogous to the back wall of the photo camera onto an imaginary spherical surface S tangential to the flat screen of the webcam. The only point where the imaginary spherical surface S will touch the flat webcam image will be the center of the image.

The program then will assume the existence of at least two sets of Spherical Harmonics with slightly different positions of their North Poles which will also be different from the center of the screen (shift).

The expansion coefficients (complex numbers) of the above mentioned function F into two or larger set of Spherical Harmonics will then be calculated 106 though numerical integration. The values of Associated Legendre Polynomials needed for the expansion will be computed through well known recurrence formulas, for instance:

$$(l - m + 1)P_{l+1}^m(x) = (2l + 1)xP_l^m(x) - (l + m)P_{l-1}^m(x)$$

Only Spherical Harmonics with certain coefficients l & m will be needed for the final computation of invariants thus simplifying the computation because the absolute values of the expansion coefficients take meaningful (above computational threshold) values only for a small subset of indices l & m.

Once the expansion coefficients are computed for two or more bases (orthogonal Spherical Harmonics with different positions of their North Poles), the invariants are computed at the next step 108, and may be stored 110. The invariants are vector products and scalar products of two sets of expansion coefficients. By definition they do not change with the position of the visual image on the (imaginary) retina, therefore when the real world objects move in front of the webcam, the computed image (reflection) on the retina will change but the invariants of spherical harmonics will not, thus allowing image recognition.

The image identification will be achieved by comparing 112 the current (analyzed) image invariants with a set of invariants of various images stored preliminary in a computer database. One or more actions can then be implemented 114 based upon the results of the comparison at 112.

Figure 2:
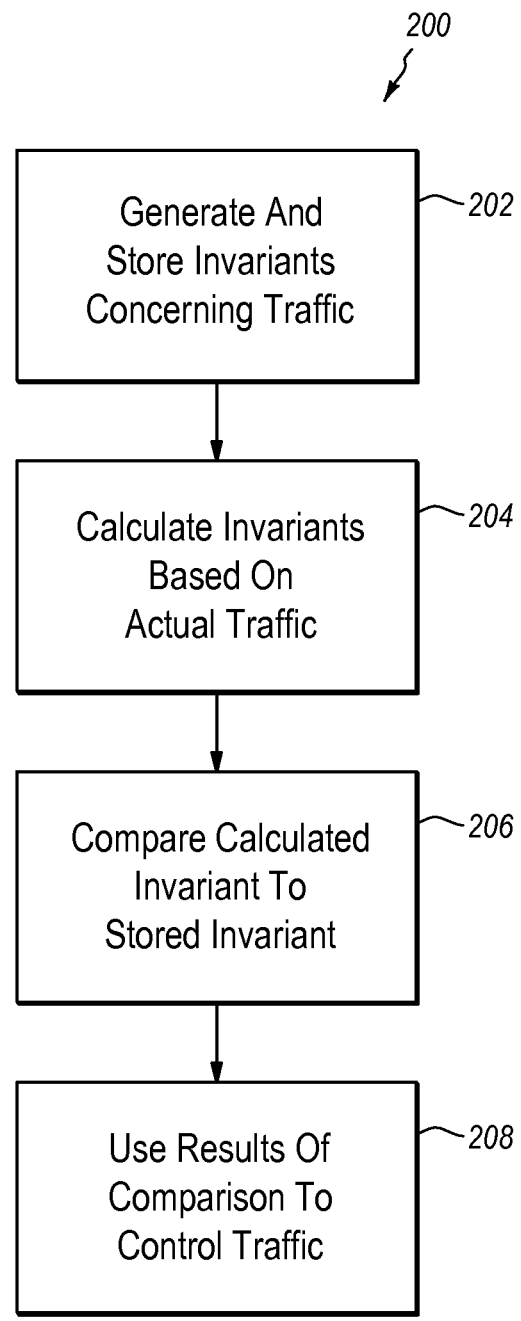
FIG. 2 is a flow diagram that discloses aspects of a method for controlling a machine based upon observations of traffic patterns.

With attention now to FIG. 2, aspects of another example embodiment are disclosed. In brief, FIG. 2 is a flow diagram that discloses aspects of a method 200 for controlling a machine based upon invariants generated in connection with a process performed by a human. As the method 200 of FIG. 2 is similar to the method 100 of FIG. 1, only selected differences between the two methods are discussed below. In the method 200, invariants concerning traffic are generated and stored 202.

At 204, invariants based upon actual traffic are calculated. The invariants generated at 204 are then compared 206 with stored invariants. The results of the comparison can then be used 208 to aid in the control of traffic.

Figure 3:
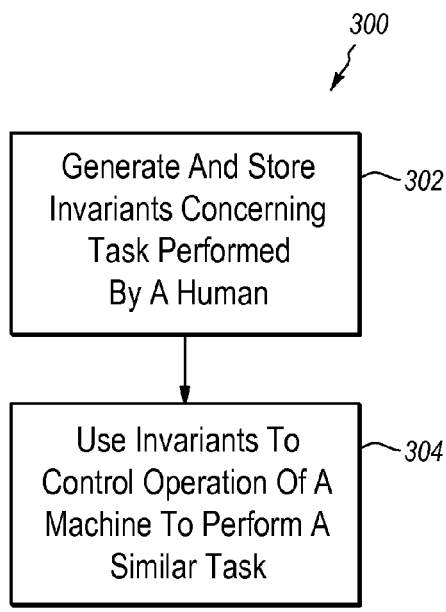
FIG. 3 is a flow diagram that discloses aspects of a method for controlling a machine based upon invariants generated in connection with a process performed by a human.

Turning now to FIG. 3, aspects of a method for controlling a machine based upon invariants generated in connection with a process performed by a human are disclosed. As the method 300 of FIG. 3 is similar to the method 100 of FIG. 1, only selected differences between the two methods are discussed below. In the method 300, invariants concerning human performance of a task are generated and stored 302.

The invariants can then be used to control 304 the operation of a machine by causing the machine to perform a task similar to that human-performed task which formed the basis for the initial generation 302 of the invariants.

Figure 4:
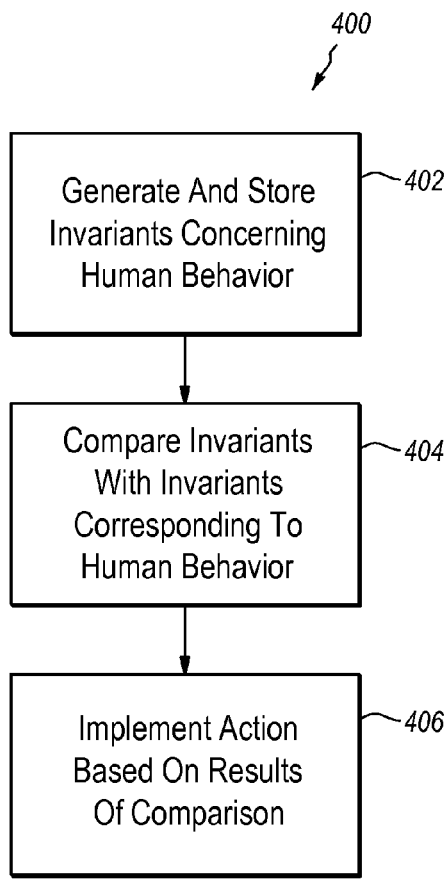
FIG. 4 is a flow diagram that discloses aspects of a method for comparing observed human behavior with one or more invariants.

With regard now to FIG. 4, a further example embodiment is disclosed that involves a method 400 for comparing observed human behavior with one or more invariants. At 402, invariants concerning human behavior are generated and stored.

Next, the previously generated invariants can be compared 404 with the invariants corresponding to observed human behavior. Finally, an action can be taken 406 based upon the results of the comparison. For example, if observed behavior exhibits threatening patterns, the appropriate authorities can be alerted.

Figure 5:
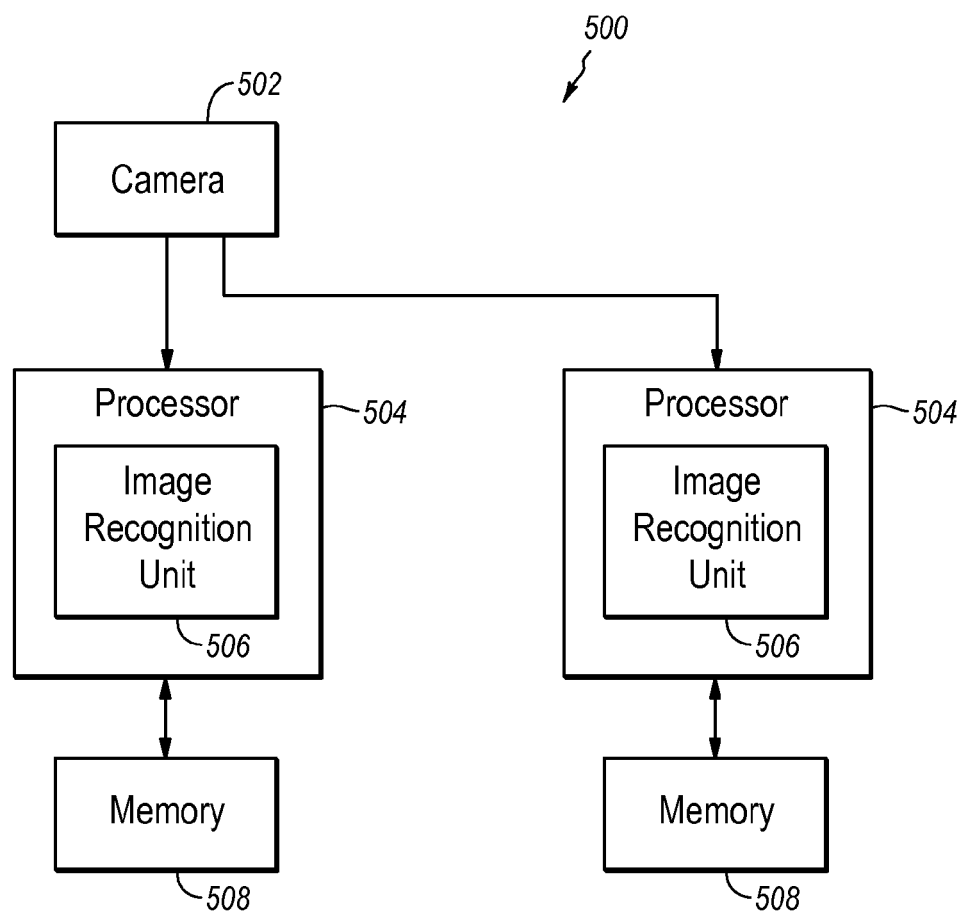
FIG. 5 is a schematic of an example image recognition apparatus that may be used to carry out aspects of one or more embodiments of the invention.

Turning finally to FIG. 5, aspects of an example image recognition apparatus 500 are disclosed. The example apparatus 500 includes a camera 502 operable to acquire an image.

The camera 502, which may comprise a webcam, is configured and arranged to communicate with a plurality of processors 504, each of which may include an image recognition unit 506 operable to execute within the processor 504 and, when executed by the processor, perform one or more methods such as those disclosed herein. Finally, a plurality of memory elements 508 may be provided that are each operatively coupled to one or more processors 504, and which may store invariants.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An image recognition apparatus, comprising:
   a camera;
   two or more processors;
   one or more memories operatively coupled to the two or more processors; and
   an image recognition unit which executes in the two or more processors from the one or more memories and which, when executed by the two or more processors, causes the apparatus to perform the following processes:
   acquiring a visual image using the camera;
   projecting the image onto a spherical surface, wherein the spherical surface is tangential to a planar surface associated with the camera at a point that comprises the center of the visual image;
   calculating expansion coefficients for the visual image using first and second independent sets of spherical harmonics having different respective North Pole positions, wherein the North Pole positions are different from a position of the center of the visual image;
   calculating invariants of the visual image using the expansion coefficients of the image; and
   storing the invariants.

2. The image recognition apparatus as recited in claim 1, wherein the camera comprises a webcam.

3. The image recognition apparatus as recited in claim 1, wherein the spherical surface is an imaginary spherical surface 'S.'

4. The image recognition apparatus as recited in claim 1, wherein the expansion coefficients are expansion coefficients of a function 'F ($\phi$, $\Theta$),' where:
   $\phi$ is the azimuthal angle of a spherical coordinate system; and
   $\Theta$ is the polar angle of the spherical coordinate system.

5. The image recognition apparatus as recited in claim 1, wherein the expansion coefficients are calculated using numerical integration.

6. The image recognition apparatus as recited in claim 1, wherein the invariants are vector products and scalar products of the expansion coefficients.

7. The image recognition apparatus as recited in claim 1, wherein the invariants do not change with position of the image on the spherical surface, such that when a real object moves in front of the camera, a computed image on the spherical surface will change but the invariants will not.

8. The image recognition apparatus as recited in claim 1, further comprising comparing a stored invariant to another invariant and causing an action to be taken based upon results of the comparison.

\* \* \* \* \*